United States Patent [19]

Carrol

[11] Patent Number: 4,832,571
[45] Date of Patent: May 23, 1989

[54] FLEXIBLE TETHERED WIND TURBINE

[76] Inventor: Frank L. Carrol, 48-55 43 St., Woodside, N.Y. 11377

[21] Appl. No.: 137,411

[22] Filed: Dec. 23, 1987

[51] Int. Cl.⁴ ............................................. F03D 11/04
[52] U.S. Cl. ................................. 416/132 B; 416/11; 416/189; 416/196 A
[58] Field of Search ............................. 416/11, 84–86, 416/196 A, 240 A, 132 B, 189 A, 170 A

[56] References Cited

U.S. PATENT DOCUMENTS

| | | | |
|---|---|---|---|
| 535,956 | 3/1895 | Norcross | 416/240 A X |
| 543,461 | 7/1895 | Bramwell | 416/240 A X |
| 2,516,576 | 7/1950 | Jacobs | 416/132 B X |
| 2,633,921 | 4/1953 | Monney | 416/240 A X |
| 4,066,911 | 1/1978 | Sarchet | 416/132 B X |
| 4,165,468 | 8/1979 | Fry et al. | 416/121 A X |
| 4,166,596 | 9/1979 | Mouton | 415/2 X |
| 4,207,026 | 6/1980 | Kushto | 416/84 |
| 4,242,043 | 12/1980 | Poulsen | 416/11 |
| 4,276,033 | 6/1981 | Krovina | 416/240 A X |
| 4,285,481 | 8/1981 | Biscomb | 416/85 X |
| 4,353,702 | 10/1982 | Nagy | 416/240 A X |
| 4,522,600 | 6/1985 | Jost | 416/11 X |
| 4,547,124 | 10/1985 | Kliatzkin et al. | 416/84 X |

FOREIGN PATENT DOCUMENTS

| | | | |
|---|---|---|---|
| 33176 | 8/1981 | European Pat. Off. | 416/132 B |
| 3126692 | 2/1983 | Fed. Rep. of Germany | 416/132 B |
| 3151620 | 7/1983 | Fed. Rep. of Germany | 416/132 B |
| 3210405 | 9/1983 | Fed. Rep. of Germany | 416/132 B |
| 2292878 | 6/1976 | France | 416/132 B |
| 1250697 | 8/1986 | U.S.S.R. | 416/84 |

OTHER PUBLICATIONS

Deiber, David D., "The Unified Wind Dynamo", Spring 1981 (article).

Primary Examiner—Everette A. Powell, Jr.
Attorney, Agent, or Firm—Darby & Darby

[57] ABSTRACT

This invention relates to a flexible tethered wind turbine useful, among other things, for generating electricity. A flexible shaft supported by guy wires is provided at its upper end with a flexible rotor and an airfoil assembly. Rotation of the airfoils in response to wind creates centrifugal force and tension which causes the rotor to become rigid during use. The light flexible shaft easily follows the rotating sails, which permits the entire turbine to automatically track the wind as it changes direction. As the rotor spins, its rotational energy is transferred to the shaft, which rotates along its entire flexible length.

20 Claims, 10 Drawing Sheets

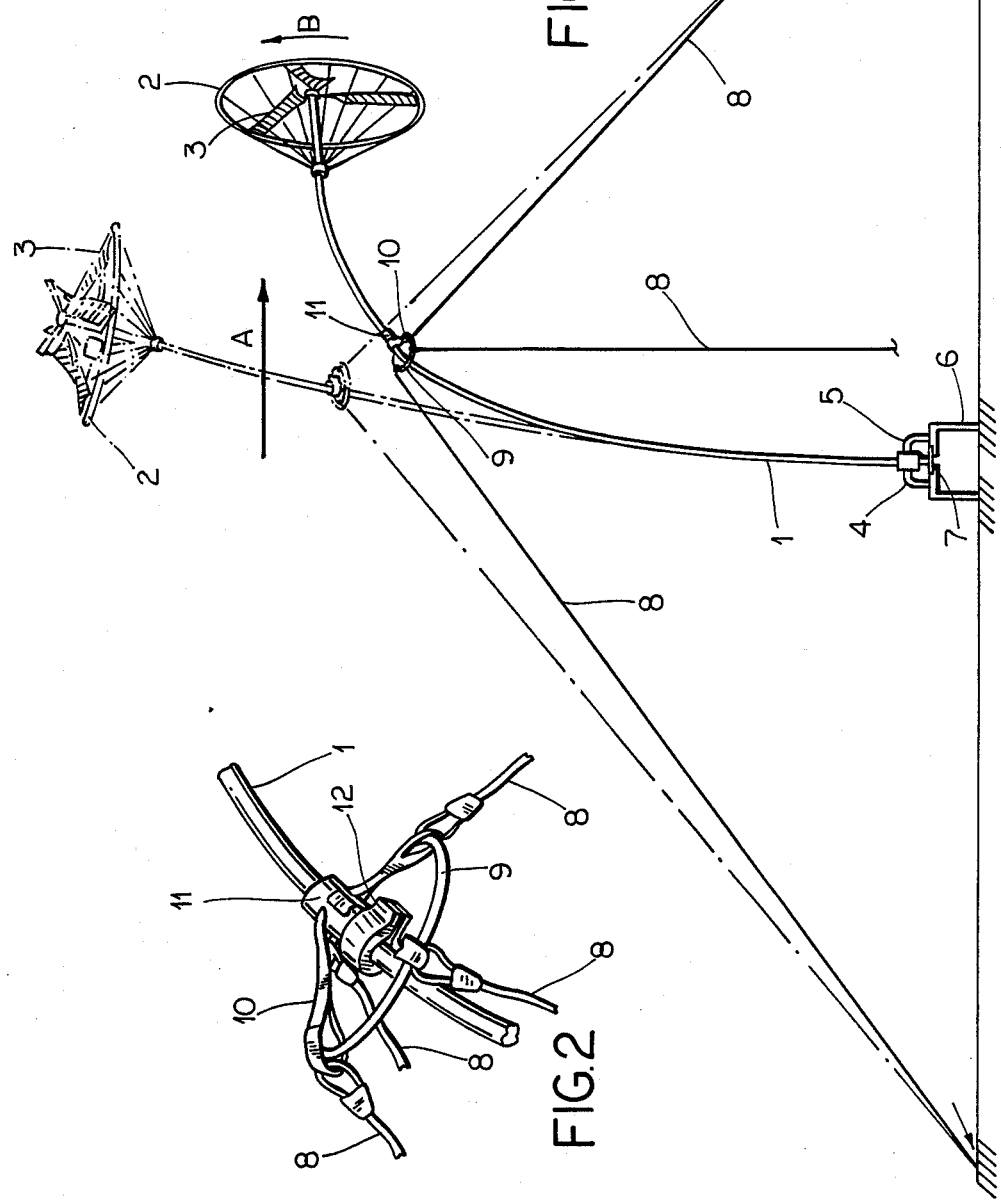

ROTATABLE PIN JOINT

TO GENERATOR

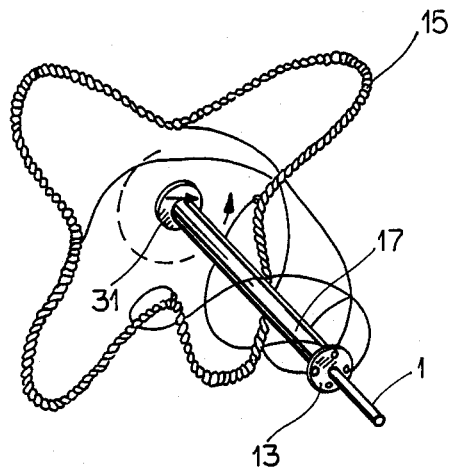
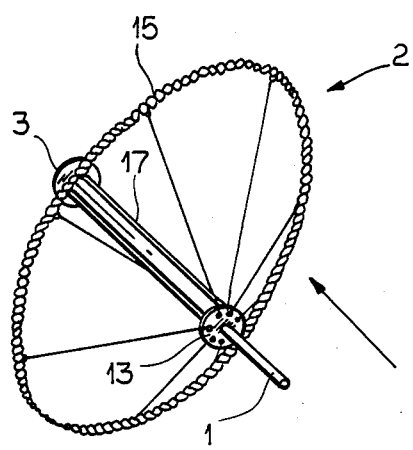
FIG. 15B   FIG. 15A
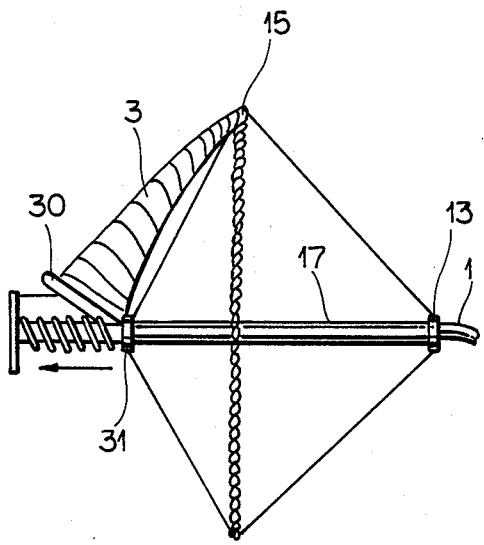
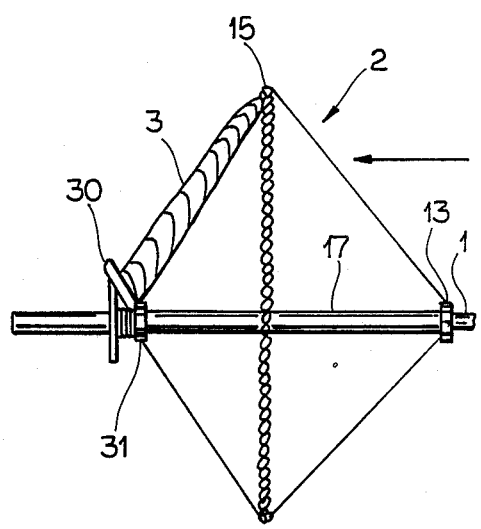
FIG. 16B   FIG. 16A

FLEXIBLE TETHERED WIND TURBINE

This invention relates to a flexible tethered wind turbine useful, among other things, for generating electricity. A flexible shaft is provided at its upper end with a flexible rotor and a flexible airfoil or sail assembly. Rotation of the airfoil or sails and rotor in response to wind creates centrifugal force in the rim of the rotor and tension, in the form of hoop stress, which causes the rotor to become rigid during use. The light flexible shaft, which is supported and tethered against the force of the wind by guy wires, easily bends and rotates to follow the rotor as it tends to move downwind, which permits the entire turbine to automatically track the wind as it changes direction. As the rotor spins, its rotational energy is transferred to the shaft, which rotates along its entire flexible length. The rotational energy can then be used at ground level, for example in combination with a generator.

BACKGROUND OF THE INVENTION

Devices have been used to harness wind energy for hundreds of years. In more recent times, the search for alternative sources of energy has generated renewed interest in wind energy, in an effort to replace or at least supplement coal, gas, nuclear and other energy sources. Many wind turbine designs are known, but these devices have so far been unable to compete economically with more conventional energy sources. The known devices generally require the expensive construction of heavy blades supported on huge towers. When built on a large scale, the known devices using propeller type blades encounter serious problems due to their weight and cantilevered design. The blades are known to crack due to fatigue failures, or even be thrown from the turbine, resulting in high safety and maintenance costs and reduced reliability. Because of their size and weight, vibrations during use, and the risk of a thrown blade, the known devices cannot be used on top of buildings.

A tilted windmill is disclosed in U.S. Pat. No. 4,242,043. Instead of a large supporting tower, a horizontal shaft is supported by a simple staying device. The windmill is mounted on a turntable, so that the propeller and shaft assembly can be rotated in order to follow the wind.

In some wind turbines the rotor can be driven by a sail in place of propellers. For example, the Cretin water pump, designed hundreds of years ago, uses a jib-type sail mounted on a mast that terminates in a hub and is braced by guy wires and a forward facing spar. In some modern designs, a shock cord o the tack of the sail can be used to allow it to luff when the wind is too strong.

Sailwing designs are also known. A sailwing is a double-sided sail having an airfoil shape that acts like a wing rather than an ordinary sail. For example, the Princeton sail wing uses many rigid members, and has an aluminum sheet on its leading edge. The known designs use masts to support the sails, are cantilevered, and sometimes rely on supporting guy wires.

Some turbines employ a rotor having a spoke-like structure, like a bicycle wheel. For example, the American Wind Turbine uses a spoked rotor to support rigid blades and a solid rim, and the rim is further supported by rigid spars. The Unified Wind Dynamo also uses a spoked rotor.

A multiple wind turbine tethered airfoil wind energy conversion system is disclosed in U.S. Pat. No. 4,285,481, which provides a means for supporting a plurality of wind turbines aloft on the same tethered airfoil. U.S. Pat. No. 4,166,596 discloses an airship power turbine, where power transmission cables are used to connect airborne turbine wheels carried aloft by a tubular-shaped aircraft with generator drive shafts below.

All of the known devices suffer from disadvantages, both in cost and efficiency, and are substantially different in structure and function from the invention claimed herein.

SUMMARY OF THE INVENTION

The disadvantages of the known devices are advantageously overcome by a tethered wind turbine according to the invention. The turbine comprises a lightweight flexible shaft supported by guy wires, a flexible rotor with a rim, made preferably of rope or cord, and a flexible airfoil or sail assembly. The rotor is made rigid by tension acting through the hoop stress in the rim, plus radial tension created by centrifugal force. Thus, the heavy propellers and rigid towers of known devices have been replaced by simple, light-weight and relatively inexpensive materials. The cost of construction is also advantageously low. In a smaller embodiment, the turbine according to the invention consists of portable parts, which can be assembled and used virtually anywhere, including the tops of buildings. There is no disturbing vibration during use, and no heavy cantilevered blade which might crack or be thrown.

The airfoil section according to the invention has no rigid leading edge. For example, the entire flexible airfoil is shaped by soft material held in place in a beam-like fashion, and is soft and collapsible. The rotor has a spoke like design. Flexible radial spokes support the airfoils on the rotor and restrain the rim with a circular configuration during rotation. Additional opposing sets of spokes arranged like a bicycle wheel are used to transmit torque from the rim to the front hub, and from the hub along the length of the shaft. No rigid propellers are used. Instead, the invention relies on centrifugal force to create the desired tension and rigidity in the structural members during operation. In the prior art, centrifugal force is not harnessed, but rather is viewed as a problem.

Due to the complete flexibility of the entire rotor, it can be easily distorted by gusts or gyroscopic forces caused by changes in wind direction—without suffering from any abnormal stresses within the rotor structure. This is not the case in rigid cantilevered designs, which become over-stressed and experience a shortened useful life due to fatigue failures.

The flexible design of the shaft, and the vertical drive of the shaft output, permits the new turbine to continuously follow the wind as it changes direction, without the need for a turntable or any other compensating means. The flexible rotor can also automatically change its angle and direction in response to shifts in the wind. The rotor is supported by a flexible and freely rotating shaft rather than a conventional generator tower. Therefore, the generator can be placed at ground level, where it can be more easily maintained. There is no need for an elevated turntable or heavy structural frame to support a heavy aboveground generator. The result is a highly efficient, low cost, and completely self-sufficient device for harnessing wind energy.

DESCRIPTION OF THE DRAWINGS

FIG. 1 shows a tethered wind turbine according to the invention in two operating positions;

FIG. 2 shows an enlarged view of a portion of FIG. 1, relating to the support structure for the wind turbine;

FIGS. 13A-16C show means of actively changing the configuration of the rotor in response to wind conditions.

DETAILED DESCRIPTION

Figure 4:
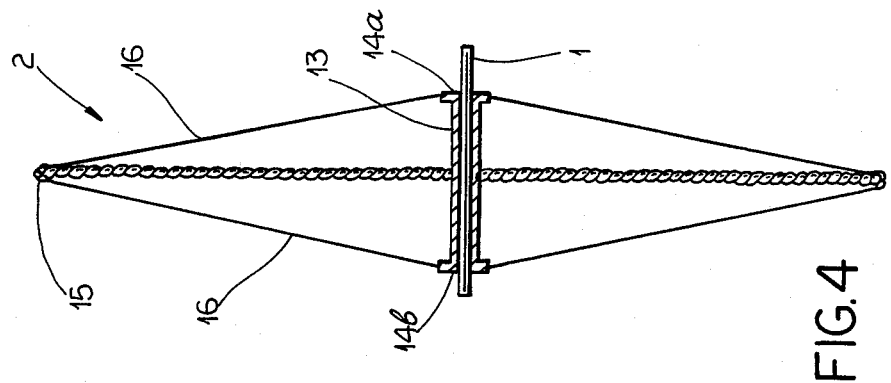
FIG. 4 shows a cross sectional view of the rotor of FIG. 3 along the line A—A in FIG. 3.

Referring to FIG. 1, the tethered turbine comprises a flexible shaft 1, a flexible rotor 2 affixed to the top of shaft 1, and flexible air foils 3 affixed to the rotor 2. Shaft 1 cooperates wit a lower bearing 4 at its lower end. The bearing 4 and shaft 1 are held in position by shaft support 5 and ground support 6. A thrust plate 7 supports the vertical weight of shaft 1 and permits shaft 1 to rotate within bearing 4. Supports 5 and 6 permit the shaft within bearing 4 to move in an inclined vertical axis, but horizontal displacement is restrained. The base of shaft 1 is also free to move away from the perpendicular axis, as provided by lower bearing 4. Thus, the shaft is constrained to move within a section of a cone.

The rotor 2 is flexible and lightweight, and becomes rigid due to centrifugal force. Shaft 1 is also flexible, and in cooperation with bearing 4, an upper bearing 11 and thrust plate 7 the shaft is free to follow the wind by bending and rotating. Two exemplary positions for the shaft are shown in FIG. 1. During operation, the shaft may bend into a natural unrestrained curve between zero and ninety degrees, depending on wind conditions. The shaft 1 is tapered toward the rotor, preferably along the upper third of its length, and the shaft is preferably a carbon-filament material. Other suitable materials include fiberglass and aluminum.

The shaft 1 is supported by guy wires 8 and upper bearing 11 (FIGS. 1 and 2). In a preferred embodiment of the shaft having a tapering upper section, the upper bearing 11 is positioned proximate to the point above where the tapering upper section begins. As shown by FIG. 2, the guy wires 8 are affixed to a ring 9 via straps 10. Straps 10 in turn are affixed to the upper bearing 11 and the upper bearing is held in position on shaft 1 by a collar 12. As shown, collar 12 is affixed to shaft 1, below and proximate to the bearing 11. The collar 12 restrains bearing 11, and maintains the position of ring 9 and guy wires 8. In this manner, the tethered turbine is held firmly in place and the tension load is removed from the shaft. However, the shaft and rotor remain free to naturally and continuously track the wind, and the shaft remains free to bend. This configuration permits the efficient transmission of torque along the length of the shaft 1 from a horizontal to a vertical plane, without subjecting the shaft to excessive stress.

Figure 12:
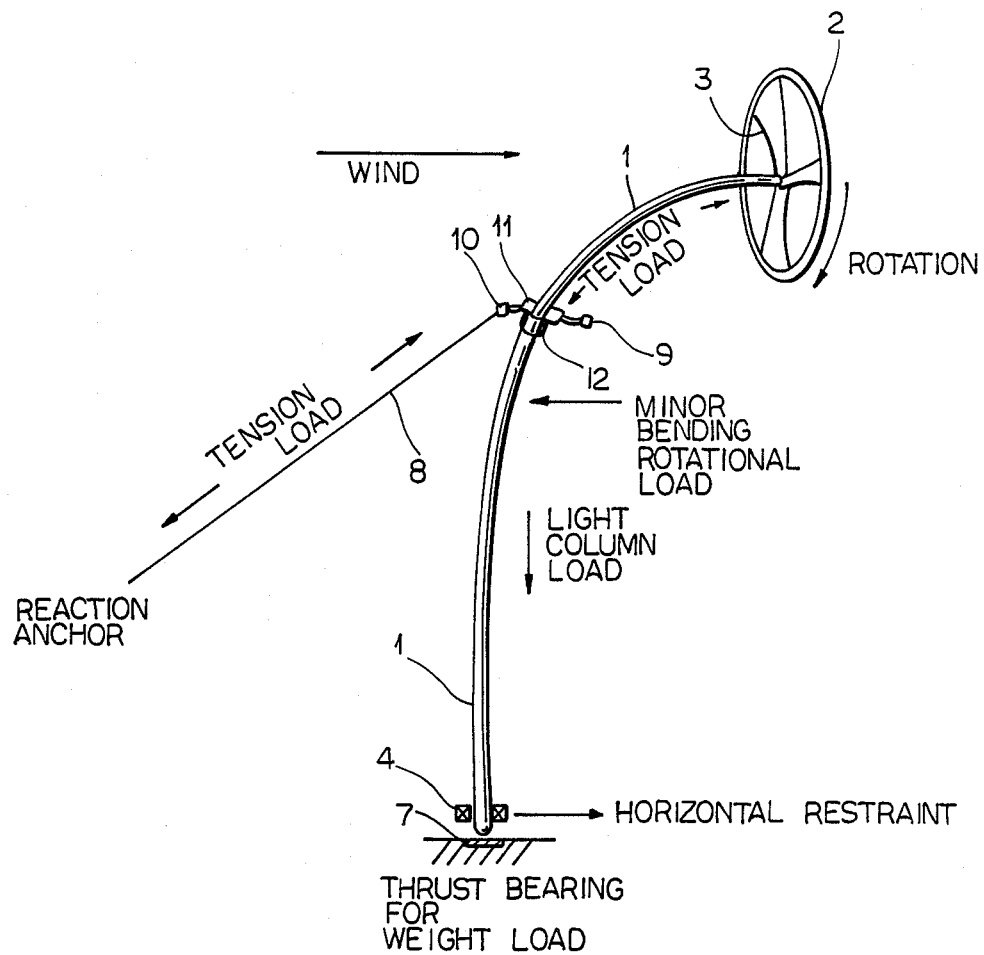
FIG. 12 shows a schematic representation of stresses experienced by the shaft of the invention.

The shaft 1 is flexible in the sense that it returns to its original shape and position if bent or deformed along its longitudinal axis, while retaining its basic shape and supporting its own weight. The shaft is supported and gains additional strength through tension, as shown for example in FIG. 12. The flexible upper portion of the shaft I restrains the rotor 2 against the force of the wind, and uniformly transmits the tension load to upper bearing 11 and the guy wires 8.

In one embodiment, not illustrated, the shaft 1 has a lower section of aluminum that is hollow and telescopes from a diameter at its base of approximately 1.25 inches to a diameter at its top of approximately 1 inch. The upper one-third section of the shaft is a fiberglass pole, attached to the top of the aluminum lower section, that continuously tapers from a diameter of about 1 inch to a diameter at the tip (near the rotor) of about ⅛th of an inch. A machined joint and screw combination that tightens on loading can be used to attach the two sections. The shaft in this embodiment weighs a total of about five pounds.

Figure 3:
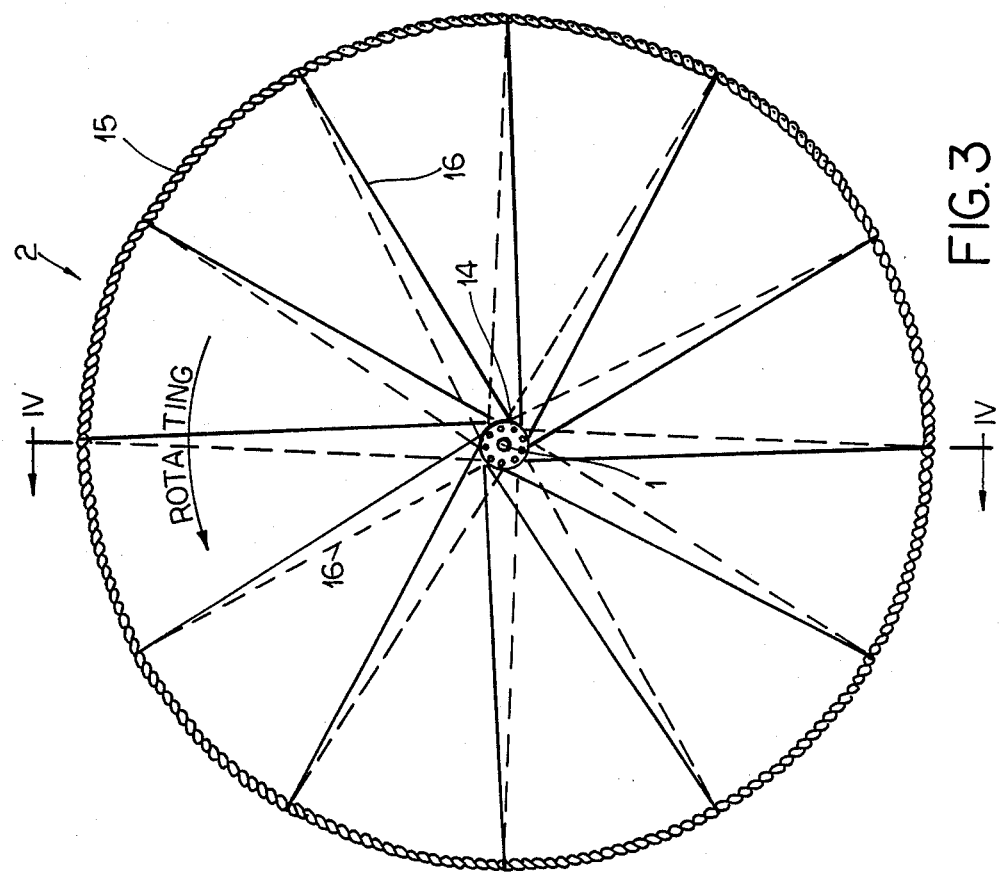
FIG. 3 shows a plane view of a rotor according to the invention.

A rotor according to the invention is shown in FIGS. 3 and 4. Airfoils 3 (not shown) are hung on a nonrigid rotor 2 comprising a simple flexible wheel having a rim 15. In operation, centrifugal force throws the rim 15 into a rigid wheel shaped rotor, which supports the airfoils during rotation. A hub 13, having flanges 14a and 14b, connects the rotor 2 to flexible shaft 1. (FIG. 4) The hub 13 serves as an axis for rim 15, which is disposed between the flanges 14a and 14b and which is preferably made of rope or cord. Sooke-like cords 16 join the rim 15 to the hub 13, via the flanges 14a and 14b. Preferably, the cords 16 for flange 14a are all of equal length, and the cords 16 for flange 14b are all of equal length. In addition to supporting the airfoils, the cords provide sufficient tension to maintain the circular shape of the rotor in operation and to impart the necessary strength to the rotor without affecting its flexible construction. The cords also transmit torque from the rotor 2 to the shaft 1.

Figure 6:
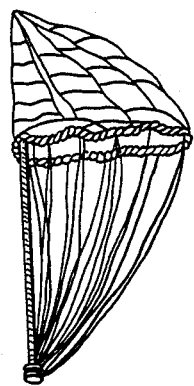
FIGS. 5 and 6 show a rotor and sail assembly according to the invention.
Figure 5:
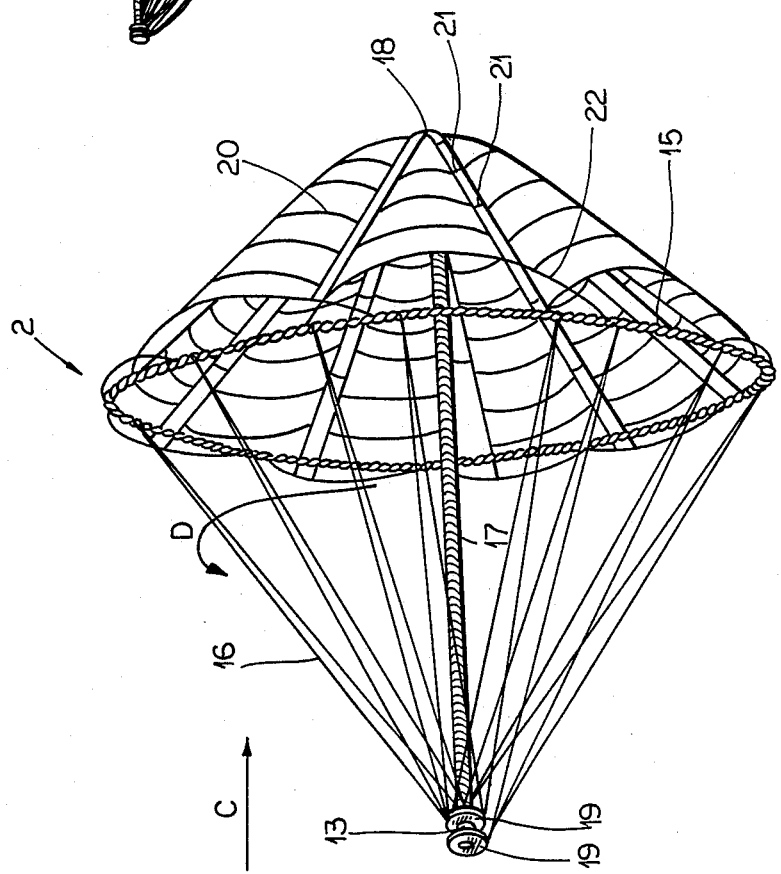

In another embodiment of the rotor 2, shown in FIG. 5, the hub 13 of the rotor 2 can be provided with an extension 17 having a rear flange 18 and two front flanges 19. A plurality of cords 16 extends from the front flanges 19 to the rim 15 in a radial spoke like manner, the rim 15 becoming rigid during rotation. The cords 16 extending from the shaft-side flange 19 are preferably all of equal length, such that the rim 15 is provided with a circular shape during rotation. This particular embodiment is provided with a parachute-type sail arrangement, with sails 20 affixed to each other in a jib sail like manner by overlays 21, and affixed to the rear flange 18 at the apex of each sail by terminal lead lines (not shown). The trailing edge of each sail 20 is affixed to the rim 15 by trailing sheet lines 22. FIG. 6 shows the same rotor, with no wind and collapsed sails.

Figure 7:
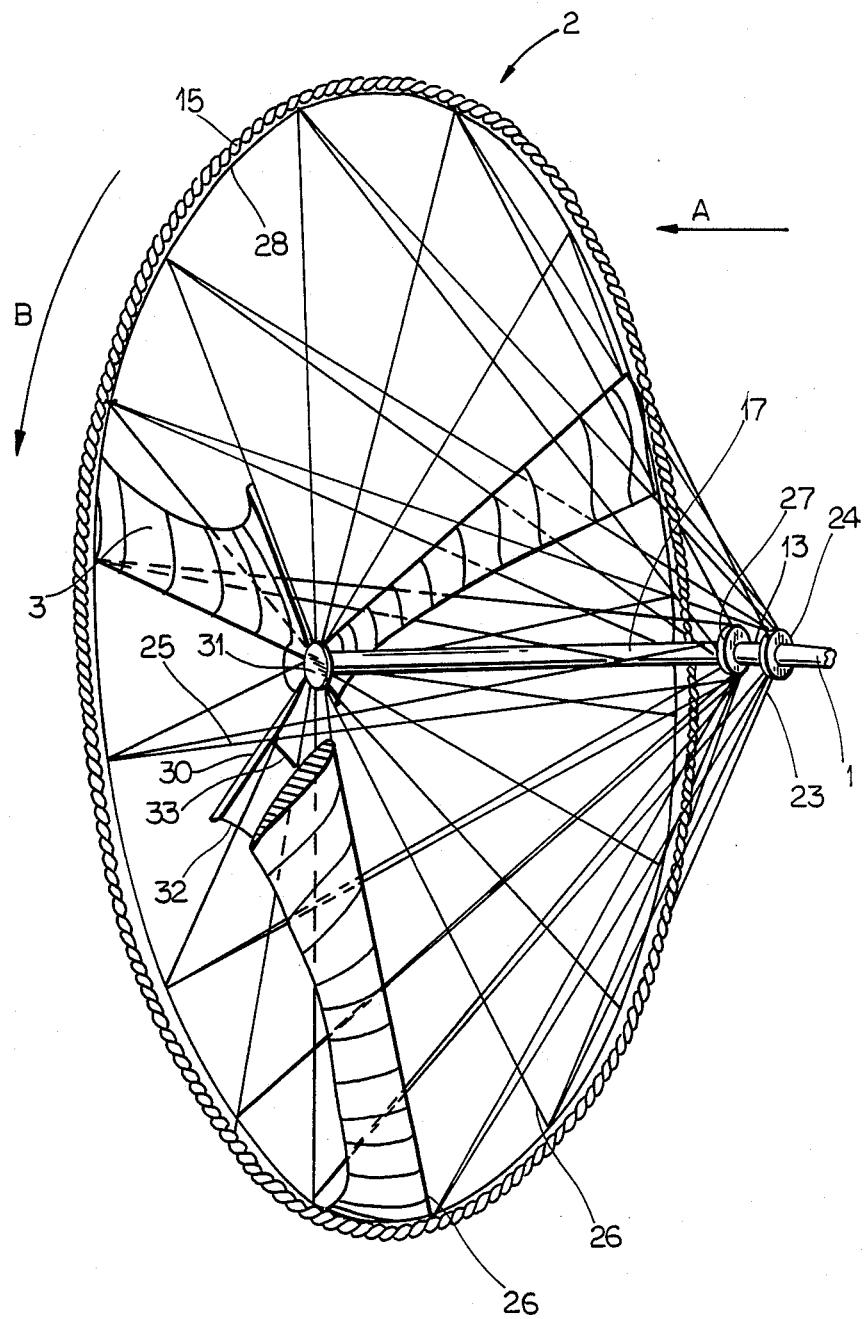
FIG. 7 shows a spoked rotor with attached sails, according to the invention.
Figure 8:
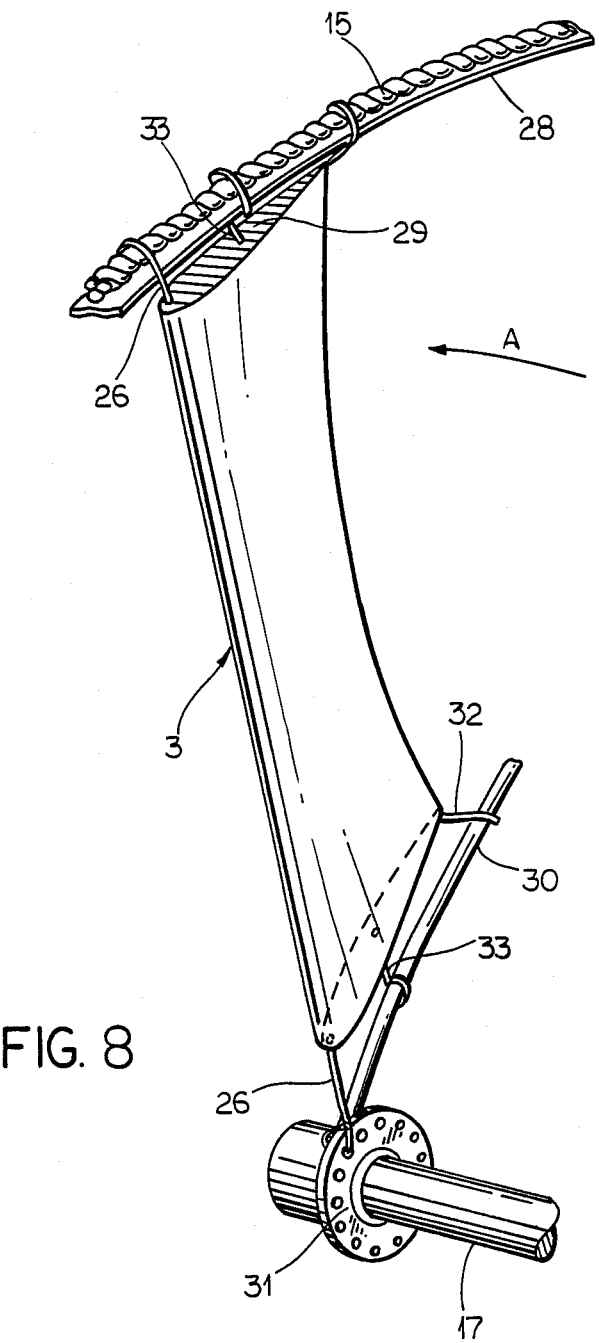
FIG. 8 shows an enlarged view of a portion of the rotor and sail assembly of FIG. 7, relating to the attachment of the sail to the rotor and to the hub.
Figure 9:
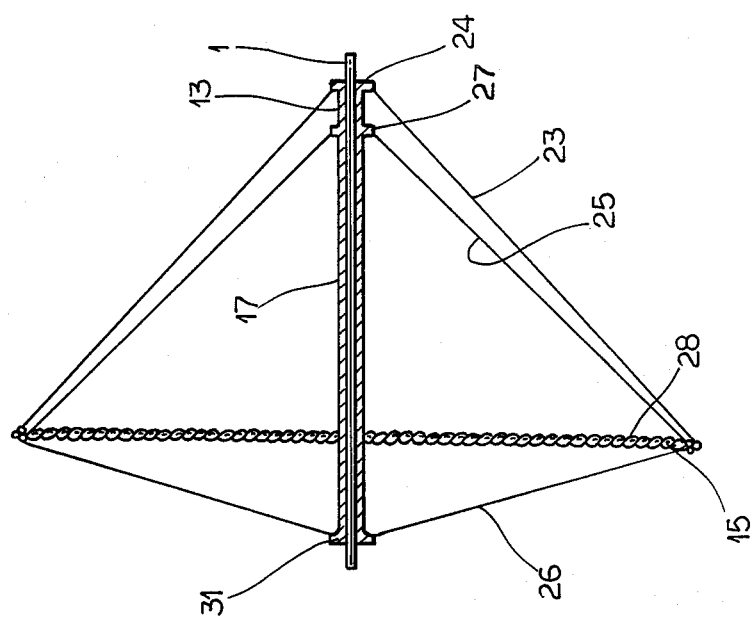
FIG. 9 shows another view of the rotor according to the FIG. 7.

In yet another embodiment of the rotor 2, showing FIGS. 7-9, one or more airfoils 3 is affixed to the rotor 2, which is held open by a flexible hoop 28. The rotor 2 is affixed to a hub 13 by a series of spoke-like cords. A first plurality of cords or tensile members 23 extend from a first front flange 24 of the hub 13 to the rim 15.

A second plurality of cords 25 extend from a second front flange 27 to the rim 15. A spar 30, associated with a rear flange 31 on the extension 17 of the hub 13, provides support for the trailing edge of each airfoil 3. A third plurality of cords 26 extends from the rear flange 31 to the rim 15 and the hoop 28. As shown also in FIG. 8, the flexible airfoil is hung on the rotor 2 by separate cord-like tensile members, which support tee airfoil in a beam-like manner between the rim 15 and the rear flange 31 and spar 30. Another view of this rotor, without airfoils, is shown in FIG. 9.

Rotational force developed by action of the wind over the airfoils 3 can be advantageously transmitted efficiently and primarily first to the rim 15, and then to the front flanges 24, 27 via the spoke like cord arrangement 23, 25. This causes the hub 13 and shaft 1 to rotate, and the rotational energy is transmitted along the shaft 1, through the upper and lower bearings 11, 4, and down to the ground. The cords 26, which extend from the rim 15 to the rear flange 31 provide resistance, and serve to maintain the circular shape of the rotor. In FIGS. 7 and 8, the direction of the wind is shown by the arrow A, and the direction of rotation is shown by the arrow B.

Referring to FIG. 8, each airfoil preferably has a foamed elastomeric construction and shape which provides specific and different predetermined angles of incidence at the tip and root of each airfoil, thus achieving a desirable twisted and tapered shape. The foam-like material can be covered with a textile material, such as nylon. Each airfoil is hung on the rotor between the hub 13 and the rim 15 via the three sets of cords 32, 33, 26 which pass long the leading and trailing edges of each airfoil, and through the midsection.

As also shown, the airfoil shape of airfoil 3 can be achieved by an internal armature or flexible form 29. The rim 15 is held open by a flexible hoop 28, and cords 26 pass in a spoke-like arrangement from a flange 31 of the hub 13, through the front portion of the leading edge of the airfoil 3, and on to the hoop 28 and rim 15. Tie lines 32 pass from the spar 30 through the trailing edge of the airfoil 3, and on to the hoop 28 and rim 15. A set of support lines 33 secures a median portion of the airfoil 3 to the spar 30 and the hoop 28 and rim 15. The rotor and airfoils of the invention are arranged to benefit from centrifugal force and the tensions created by centrifugal force. As a result, there is no need to apply conventional means of compensating for centrifugal force, nor is it necessary to use permanently rigid turbine blades. In fact, the present invention relies on centrifugal force to create the desired rigidity of the rotor and airfoil assembly during operation.

In a turbine rotor according to the invention, the speed of the rotor can be decreased in a strong wind by forcing the spar supporting the trailing edge of the root of the airfoils downwind. By forcing the spar downwind, the twist in the airfoils can be increased until the rotor stalls. The spar 30 can advantageously be forced downward within a functional range causing the root of the airfoil 3 to act as a propeller. In this manner, energy generated at the tip of the airfoil 3 can be absorbed at the root of the airfoil 3 in high winds.

The flexible rotor 2 is made of materials that are generally more flexible than the shaft, but less flexible than the airfoils 3. For example, the rim 15 may be made of rope, which is completely moveable in any direction except along its longitudinal axis, and which is collapsible and bendable. The hoop 28 may be made of fiberglass, so that the rotor can, if desired, be held open in a circular configuration. The airfoils are made of materials that can be bent or deformed in virtually any direction, and which are collapsible and soft, but which in general retain their shape and which return to their original shape when a deforming force is removed. One example of an airfoil according to the invention is made of sculpted foam rubber, neoprene or some other foam-like synthetic elastomer material. Since foam may be somewhat porous to wind, the surface of the foam-like airfoil can be covered with a denser textile material that is stronger but also flexible because of its thinness. Suitable materials include nylon or sail cloth.

As shown in FIG. 8, each airfoil 3 is advantageously affixed to the rim 15 (and/or the hoop 28) at an oblique angle, so that one corner of the outer end of the airfoil 3 is proximate to the inner edge of the rim 15 (and/or the hoop 28), and the other corner of the outer end of the airfoil is proximate to the outer edge of the rim 15 (and/or the hoop 28). In another embodiment (not shown), the airfoil can be provided with a flexible internal sheet, which substantially bisects and just exceeds the length of the airfoil in the longitudinal direction, i.e., extending generally from the spar 30 to the hoop 28. The internal sheet is preferably made of mylar, or some other material that is substantially more flexible and yielding in one direction as opposed to the other. The sheet is oriented within the airfoil 3, as an integral support structure, with the sheet oriented so that it is relatively flexible in the longitudinal direction (between the spar and the rim) and relatively rigid in the transverse direction (between the leading and trailing edges of the airfoil).

In operation, the tethered turbine according to the invention functions as follows. The rotor 2 (FIG. 1) responds to the wind and functions in a horizontal or semi-horizontal axis position. When there is no wind, the shaft 1 is vertical, and the axis of the rotor 2 is vertical. Wind arriving at the rotor 2 from any direction will flow over the airfoils 3, causing lift, thereby inducing the rotor 2 to rotate, and also pushing the airfoils 3 and rotor 2 downwind, as shown by arrow A in FIG. 1. The direction of rotation is represented by arrow B. However, the airfoils and rotor are restrained by the flexible shaft 1, bearing 11 and guy wires 8, causing the rotor 2 to orient itself in a horizontal or semi-horizontal plane, through the bend in the upper portion of shaft 1. As it rotates, rotor 2 transmits its horizontal rotation into vertical rotation through the bend in shaft 1. Thus, the tethered turbine according to the invention is a downwind machine. The shaft 1 also permits the rotor to track the wind through a complete hemisphere. As a result, the wind energy is converted into rotating mechanical energy that is made available at the lower end of the shaft. This energy may b harnessed for any suitable purpose, for example to drive a generator for the production of electricity.

Figure 10:
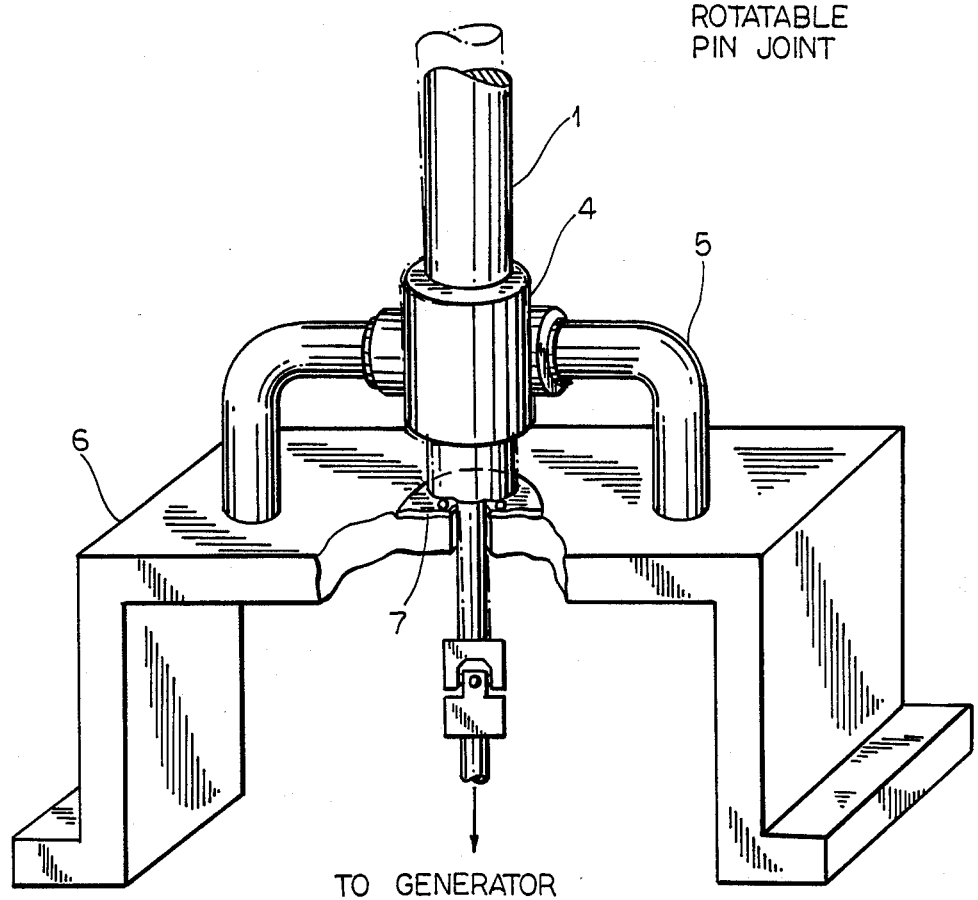
FIG. 10 shows an exemplary means for connecting the invention to a conventional generator.

FIG. 10 shows how the lower bearing 4 allows the axis of the shaft 1 freedom to rotate so as to define the surface of a cone. This lower bearing configuration only restrains motion in the horizontal plane. Facing lower bearing in the illustration, it is clear that the rotatable pin joint shown in FIG. 11 permits rotation about the horizontal axis of shaft support 5 and about a second horizontal axis transverse to that first horizontal axis. Horizontal restraint in and out of the plane of illustration is prevented by shaft support 5. Endwise motion from side to side in the plane of the illustration is prevented by restraints on shaft support 5, like snap rings, collars or flanges on the shaft support.

Figure 11:
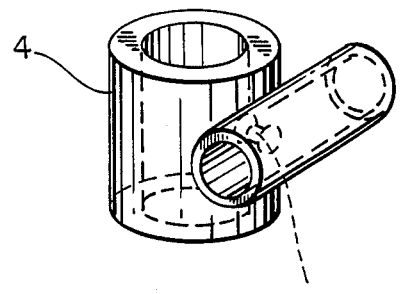
FIG. 11 shows an enlarged view of a portion of FIG. 10.

FIG. 11 is a detail of the lower bearing which comprises two journal bearings joined together by a rotatable pin joint. The vertical axis bearing holds the shaft 1 and the horizontal axis bearing rides on shaft support 5 and is free to rotate on the shaft support 5.

In FIG. 10 the lower portion of the shaft 1 is shown riding on the thrust plate 7. In the illustration, a ball bearing race is shown to reduce the friction between the end of the shaft and the plate, however it could operate directly as a bearing surface also. Since the end of the shaft can freely move in a conical section, transmission to a fixed generator or other driven machine is best facilitated by a universal joint. This is shown on the lowermost end of shaft 1 and leads to the stationary generator.

Power can also be taken by means of conventional gears or pulleys and belts from the shaft 1 just above the lower bearing 4, but this is not illustrated in the figures. In that case, there would be no need for the extension on the end of the shaft to carry the power through the ground support 6.

In embodiments having a rotor with a semi-flexible hoop supporting the rim, wind reaching the airfoils causes the rotor to spin. In embodiments lacking the hoop, initial rotation can be induced by mechanically rotating the shaft until the rotor catches the wind and rotates on its own.

In an embodiment having a 6-foot diameter rotor operating at a height of 15 feet, it has been found that the rotor will be deflected and begin rotation in winds speeds of about 9 mph and higher. Full deflection of the rotor to a 90 degree (horizontal) position occurs in winds of about 13 mph.

In excessively high winds, a means for reducing the rotor speed and avoiding damage to the rotor can be provided. In particular, the extension 17 can be constructed in two sections which move with respect to each other between the front and rear flanges, either toward or away from each other telescopically, or by rotation with respect to each other. In these embodiments, the hoop 28 must be made of a material that distorts easily.

Figures 13A, 13B, 13C:
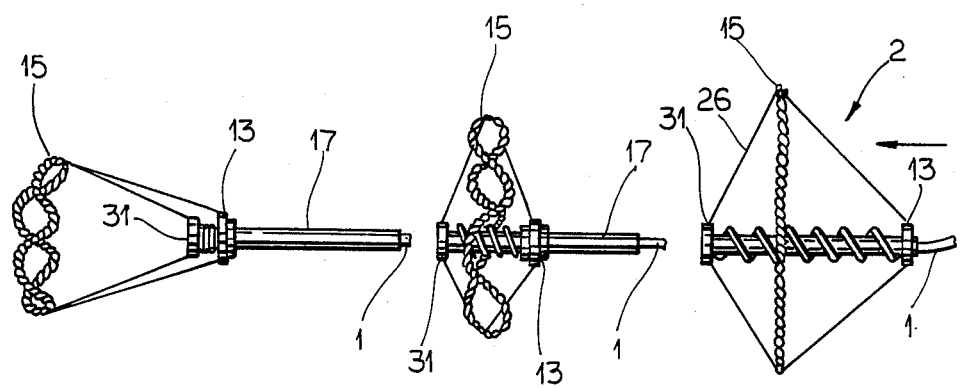

As shown in FIG. 13, in an embodiment where the two sections move toward each other, the front flanges of the hub will move downwind toward the rear flanges, against spring pressure, in response to excessively high winds. This will result in a gradual collapse of the rigid rotor structure that is maintained by tension.

Figures 14A, 14B:
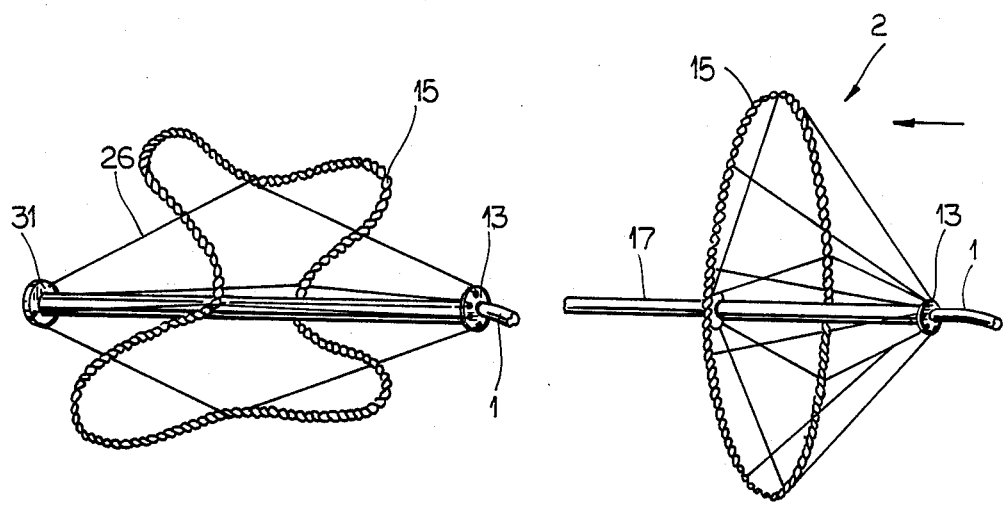

In the embodiment of FIG. 14, the two sections of extension 17 are held together by spring pressure, but can slide apart in response to sufficiently high winds and the excessive pressure exerted on the airfoils 3. As a result, the operative circular configuration of the rotor is distorted as shown.

In FIG. 15, two spring-loaded sections of extension 17 are permitted to rotate with respect to each other in response to wind forces in excess of the spring tension. As a result, the rotor will collapse in response to excessive winds, by causing the hoop and rim to twist and the airfoils to become furled.

In yet another embodiment, shown in FIG. 16, the airfoils can be spring loaded so that they feather in response to excessive winds. For example, a wind disc or sail-like member could be attached to the spar. In high winds, the disk would be pushed downwind, causing the end of the spar to follow. This action will limit the speed of the rotor, because the root of the airfoil will act as a propeller and brake the power generated by the tip. When the wind speed decreases, the airfoils will automatically return to their initial effective position.

It will be understood by skilled practitioners that these embodiments are exemplary, and do not serve to limit the scope of the invention or the appended claims.

What is claimed is:

1. A flexible tethered wind turbine comprising:
   a flexible and resilient load-bearing drive shaft having upper and lower ends, said shaft being tapered toward the upper end along at least a portion of its length, and being straight in a non-rotational rest mode and actively bendable in response to changing wind conditions through a curve in a rotational operating mode;
   a flexible and non-resilient rotor having a hub and a rim, said hub being affixed to the upper end of said shaft and having at least one flexible sail affixed to said hub and rim, said rim being flaccid in the non-rotational rest mode and firm in the rotational operating mode;
   a first support means having a lower bearing in axial cooperation with said shaft, proximate to the lower end thereof, said lower bearing permitting free rotation and restrained vertical and horizontal movement of the shaft; and
   a second support means comprising an upper bearing disposed on the shaft between said lower bearing and said upper and, and guy wires affixed to said upper bearing via restraining means in a manner which tethers said shaft without interfering with the rotation and movement thereof.

2. A tethered wind turbine according to claim 1, wherein said shaft is made from a material selected from the group consisting of fiberglass, aluminum and a carbon filament material, is rounded at its lower end, and is bendable through an arc ranging from approximately zero to ninety degrees.

3. A tethered wind turbine according to claim 1, wherein said first support means additionally comprises a base, a thrust plate, and means for securing said base and thrust plate to said lower bearing, and wherein said lower bearing restrains the horizontal movement of said shaft within a section of a cone.

4. A tethered wind turbine according to claim 1, wherein said restraining means comprises a collar affixed to said shaft below and proximate to said upper bearing, a ring affixed to said guy wires via straps, said straps in turn being affixed to said upper bearing.

5. A tethered wind turbine according to claim 1, wherein said rotor is provided with three equally spaced airfoil-shaped sails, each being entirely flexible and comprising a foam-like material covered by a textile material.

6. A tethered wind turbine according to claim 1, wherein said
   hub is tubular and has at least two flanges, one at each end, said hub being axially disposed within said rim, and
   a plurality of cords extending from said flanges to said rim in spoke like fashion.

7. A tethered wind turbine according to claim 6, wherein said rim is made of rope and said rotor additionally comprises a lightweight semi-flexible circular hoop adapted to impart a circular shape to said rim.

8. A tethered wind turbine according to claim 6, wherein said hub is provided with two front flanges and one rear flange, a first and second plurality of cords extending from said front flanges to at least one of said rim and said hoop in spoke-like fashion, said first and second cords being in opposite directions, and a third plurality cords, each of equal length, extending in a radial spoke arrangement from said rear flange to at least one of said rim and said hoop.

9. A tethered wind turbine according to claim 7, wherein
said sail is an airfoil-shaped sailwing affixed to the rotor,
a first plurality of cords extend from a rear flange of the hub to windward side of the hoop and rim, said first cords supporting the leading edge of each sailwing,
a second plurality of cords extend from the rear flange to a lee side of the hoop and rim, said second cords supporting the trailing edge of each sailwing.

10. A tethered wind turbine according to claim 9, wherein said second cords support said trailing edges in cooperation with a lightweight spar arrangement, said spar being affixed to and extending outward from said rear flange, and wherein each sailwing has a foamed air foil shape supported by a third plurality of cords extending from said spar to the hoop and rim.

11. A tethered wind turbine according to claim 7, wherein said sail comprises a collapsible sailwing supported by a spar in a beam-like manner and having an airfoil shape, said spar being affixed to the hub, and said sailwing being affixed to said spar and said hoop, rim and hub by said plurality of cords, said sailwing having a first set of cords passing longitudinally therethrough proximate to its leading edge from said hub to said rim and hoop, a second set of cords extending from said spar through the center of said sailing to said hoop and rim, and a third set of cords extending through the trailing edge of said sailwing from said hoop and rim to said spar.

12. A tethered Wind turbine according to claim 11, wherein said sailwing is made of a flexible foam rubber, wrapped with a textile material.

13. A tethered wind turbine according to claim 1, additionally comprising means for harnessing the rotation of said shaft.

14. A tethered wind turbine according to claim 4, wherein said guy wires are at least from 3 to 4 in number and are firmly anchored.

15. A tethered wind turbine according to claim 7, wherein said sail is provided with a flexible internal armature in the form of a thin sheet of material that is relatively flexible in a longitudinal direction and relatively rigid in a lateral direction, said armature extending through said airfoil and providing a connection between said airfoil and said rim at a predetermined angle.

16. A tethered wind turbine according to claim 13, wherein said means for harnessing the rotation of said shaft comprises a generator in combination with a means selected from the group consisting of a lateral belt and pulley arrangement and an axial direct drive arrangement.

17. A tethered wind turbine according to claim 6, wherein said hoop is collapsible and said hub comprises two telescopic sections that are permitted to move with respect to each other against a predetermined spring pressure in response to excessive wind forces.

18. A tethered wind turbine according to claim 17, wherein said telescopic sections may move against said predetermined spring pressure by one of rotating with respect to each other, moving away from each other, or moving toward each other.

19. A tethered wind turbine according to claim 10, wherein said spar is provided with a spring-loaded sail adapted to pull the spar downwind and at least partially feather said airfoil when wind forces exceed a predetermined spring pressure.

20. A flexible tethered wind turbine comprising:
a flexible and resilient load-bearing drive shaft having upper and lower ends, said shaft being made from a material selected from the group consisting of fiberglass, aluminum and a carbonffilament material, being rounded at its lower end and tapered toward the upper end along at least a portion of its length, and being straight in a non-rotational rest mode and actively bendable in response to a changing wind conditions through a curve ranging approximately between zero and ninety degrees in a rotational operating mode;
a flexible and non-resilient rotor having a hub and a rim, said hub being affixed to the upper end of said shaft and having at least one entirely flexible airfoil-shaped sail comprising a foam-like material covered by a textile material, said sail being affixed to said hub and rim, said rim being flaccid in the non-rotational rest mode and firm in the rotational operating mode;
a first support means having a base, a thrust plate, a lower bearing in axial cooperation with said shaft and proximate to the lower end thereof, said lower bearing permitting free rotation and restrained vertical and horizontal movement of the shaft within a section of a cone, and means for securing said base and thrust plate to said lower bearing; and
a second support means comprising an upper bearing disposed on the shaft between said lower bearing and said upper end, and guy wires affixed to said upper bearing via restraining means comprising a collar affixed to said shaft below and proximate to said upper bearing, a ring affixed to said guy wires via straps, said straps in turn being affixed to said upper bearing, in a manner which tethers said shaft without interfering with the rotation and movement thereof.

* * * * *